UNITED STATES PATENT OFFICE.

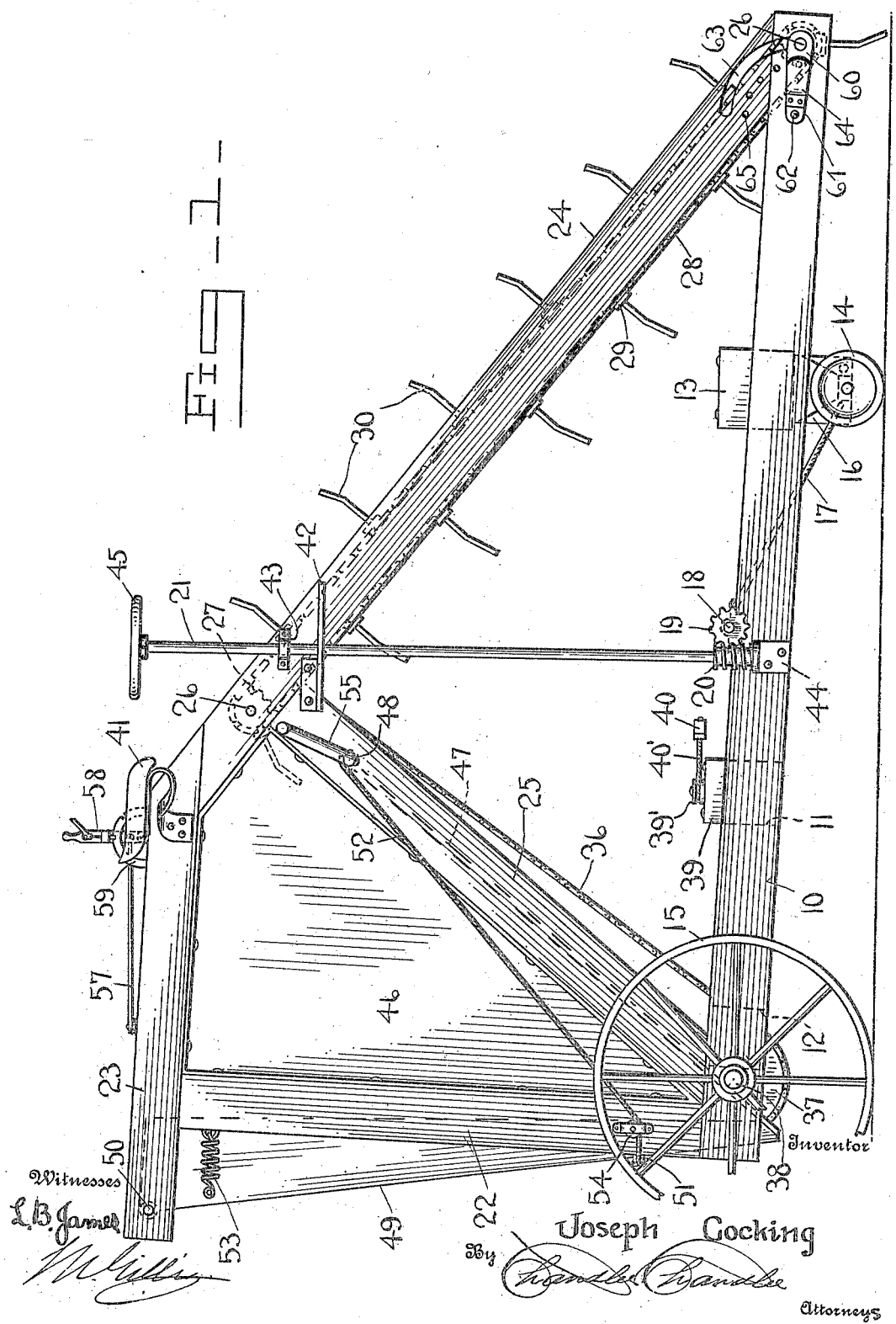

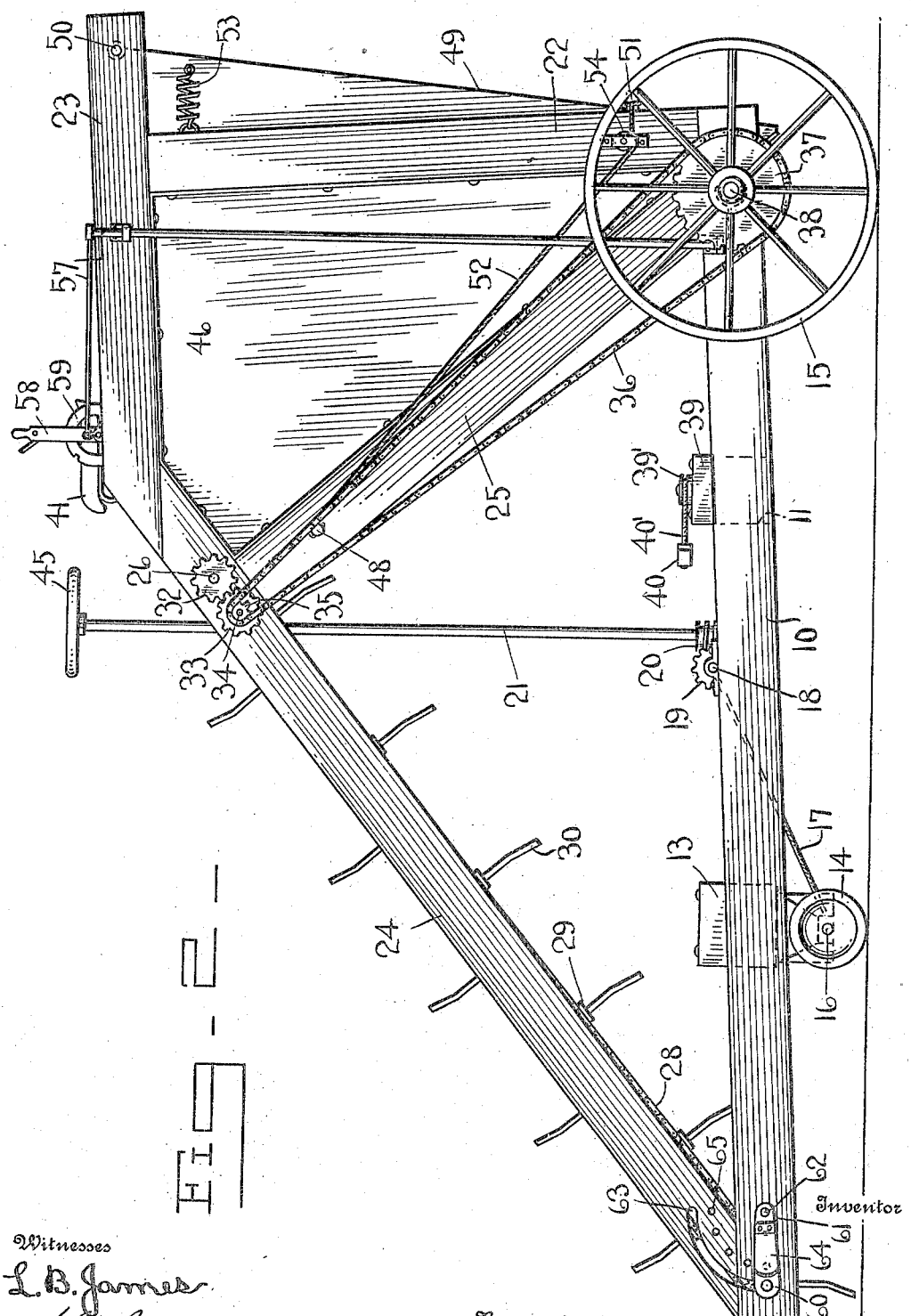

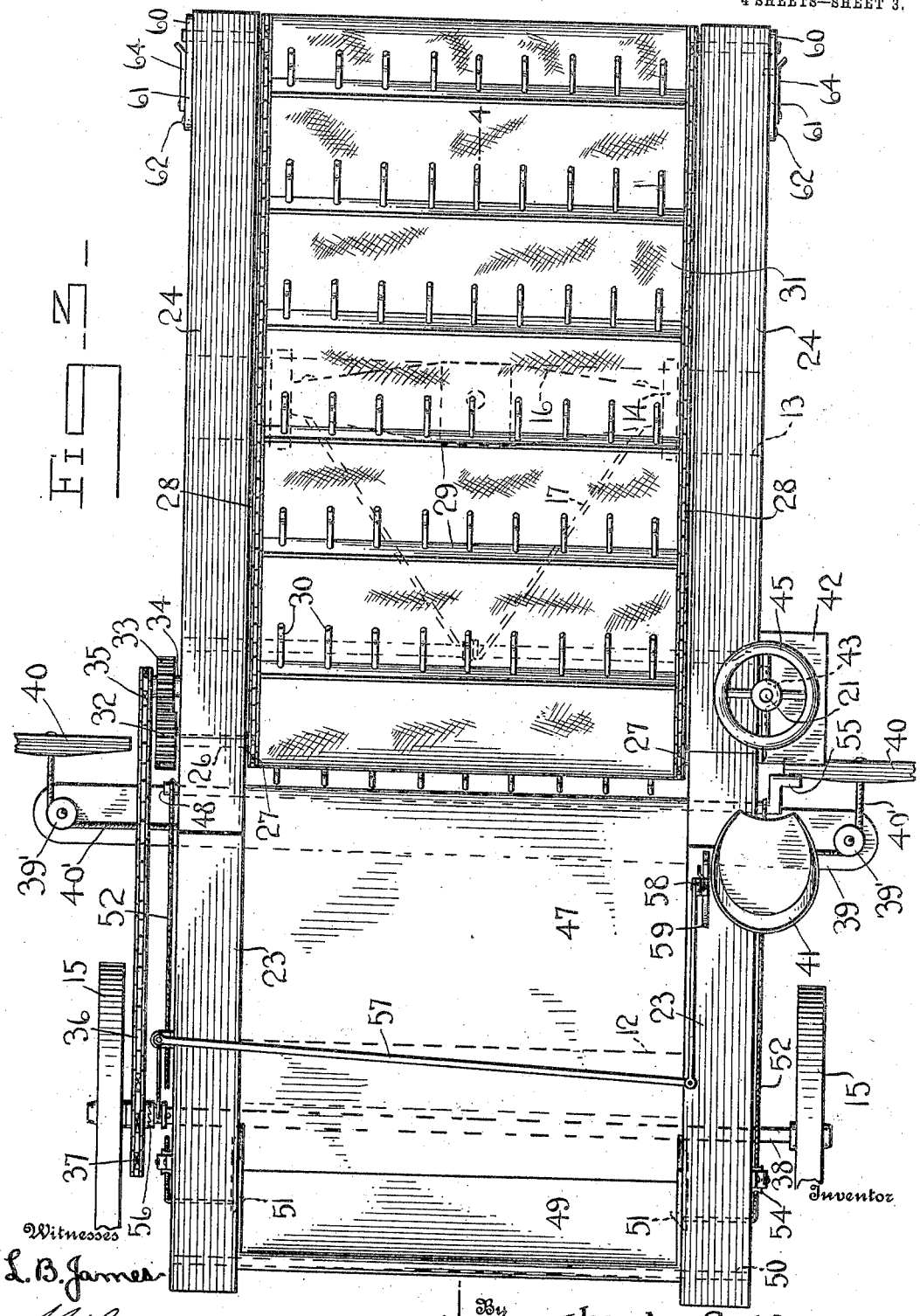

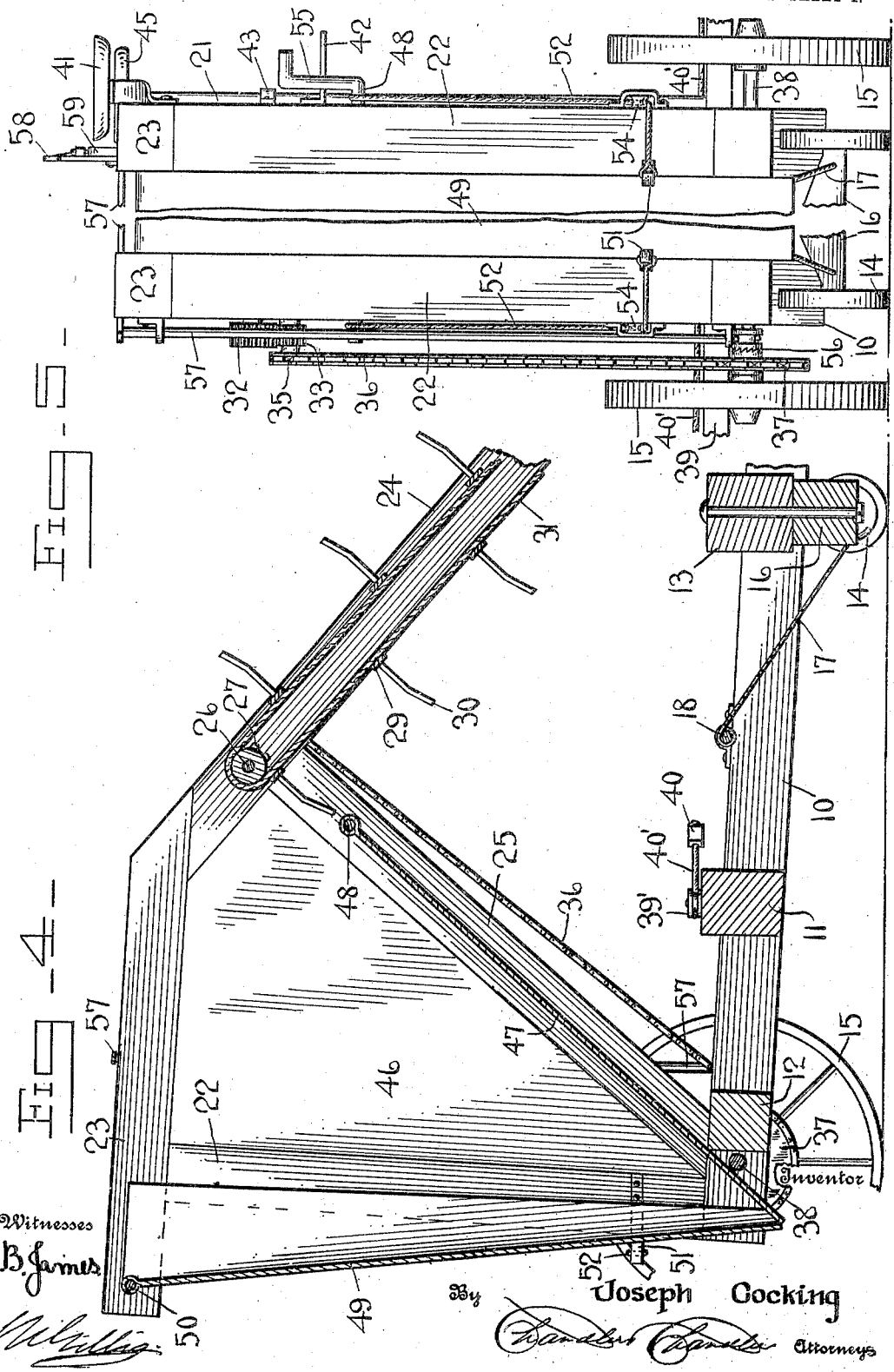

JOSEPH COCKING, OF ESMOND, NORTH DAKOTA.

SHOCK AND HAY LOADER.

948,006.  Specification of Letters Patent.  Patented Feb. 1, 1910.

Application filed November 2, 1908. Serial No. 460,606.

*To all whom it may concern:*

Be it known that I, JOSEPH COCKING, a citizen of the United States, residing at Esmond, in the county of Benson, State of North Dakota, have invented certain new and useful Improvements in Shock and Hay Loaders; and I do hereby declare the following to be a full, clear, and exact description of the invention, such as will enable others skilled in the art to which it appertains to make and use the same.

This invention relates to shock and hay loaders of that kind characterized by an endless rake or carrier which picks up the shocks or hay and conveys the same to a box or receptacle mounted on the machine.

The invention has for its object to improve and simplify the general structure of the machine, and also to provide a receptacle from which the load may be automatically dumped without the operator leaving his seat.

In the accompanying drawings, Figure 1 is a side elevation of the machine. Fig. 2 is a similar view of the opposite side of the machine. Fig. 3 is a plan view. Fig. 4 is a longitudinal section on the line 4—4 of Fig. 3. Fig. 5 is a rear end view of the machine with certain of the parts broken away.

Referring more particularly to the drawings, the supporting frame of the machine comprises side sills 10 connected at their rear ends by cross bars 11 and 12, and near their front ends by a cross bar 13. The frame is mounted on front wheels 14, and rear wheels 15. The front wheels are the steering wheels, and are carried on an axle 16 which is pivotally connected to the bar 13. To the ends of the axle 16 are connected the ends of a cable 17 which is wound around a transverse shaft 18 mounted in bearings on the sills 10. On the shaft 18 is a worm wheel 19 which meshes with a worm 20 on a vertical shaft 21 whereby the shaft 18 is turned to swing the axle 16 on its pivot, and thus steer the machine.

Mounted on posts 22 rising from the rear end of the sills 10, is a pair of horizontally disposed parallel beams 23 which are connected at their front ends to downwardly inclined beams 24 which extend toward the front end of the sills 10, to which they are made fast. The beams 24 are braced by inclined beams 25 extending between said beams and the sills 10. At the upper and lower ends of the beams 24 are bearings for transverse shafts 26 on which are mounted sprocket wheels 27 connected by chains 28. The chains 28 carry cross slats 29 armed with rake teeth 30. To the under side of the slats 29 is fastened an endless apron 31. On the upper shaft 26 is a gear 32 which meshes with a gear 33 on a countershaft 34 mounted in bearings on one of the beams 24. On said countershaft is also a sprocket wheel 35 which is connected by a chain 36 to a sprocket wheel 37 on the rear axle 38 of the rear wheels 15. Through the gearing herein described, the endless rake or carrier is driven from the axle 38 when the machine is traveling across the field.

The ends of the cross beam 11 are extended to form draft poles 39 carrying swingle-trees 40 at their ends, to which swingle-trees the draft animals are hitched. Upon the ends of the draft poles are mounted rollers 39' and the swingle-trees are connected by means of a rope 40' passing around these rollers, the rope forming an equalizer.

On one of the beams 23 is mounted the driver's seat 41, and on one of the beams 25 on that side of the machine is mounted a foot rest 42. The beam 24 on the same side of the machine has a bearing 43 for the shaft 21, the lower end of which is journaled in a step bearing 44 on the sill 10. The shaft 21 is located in front of the seat 41 and is fitted at its upper end with a hand wheel 45 for turning the same to steer the machine through the gearing already described.

At the rear end of the machine is a hopper-shaped receptacle into which the endless rake or carrier discharges, the upper or discharge end thereof being located adjacent to the mouth of said hopper. The hopper has side walls 46 extending between and secured to the posts 22 and the beams 25, and an inclined front wall comprising a sheet metal plate 47 pivotally hung at its upper end on a cross rod 48 extending between and mounted in the beams 25. The lower end of the plate 47 rests on the cross bar 12. The rear wall of the hopper is a sheet metal plate 49 which is pivotally hung at its upper end on a cross rod 50 extending between and mounted in the beams 23. The lower end of the plate 47 extends down to the lower end of the plate 46 and is adapted to be held thereagainst by spring catches 51 mounted on the posts 22. The catches are operated by ropes or cables 52 connected thereto and wound on the shaft 48 extending across and journaled in the beam 25, said rope or cable being led to the catches over suitably located guide pulleys 54. The shaft 48 is located below the driver's seat 41 and has a crank 55 through which the shaft may be rocked by the driver's foot to release the catches. The receptacle being hopper-shaped, and the rear wall being hinged at the top, it will be seen that the load will be automatically dumped when the catches are disengaged from said rear wall. After the load is dumped, the rear wall swings back and is held in closed position upon engagement of the catches therewith. To swing the rear wall to engage the catches there are provided suitable springs 53.

On the drive axle 38 is a suitable clutch mechanism 56 for throwing the machine into and out of gear. The clutch is operated from the driver's seat by a suitable system of links and levers 57 connected to a latch lever 58 mounted to engage a quadrant 59 adjacent the driver's seat.

In order to adjust the tension of the belt and to raise and lower the same the lower shaft 26 is mounted in bearings 60 which are formed at the ends of arms 61 pivoted as at 62. The beams 24 are provided with arcuate slots 63 the center of the arc being the center of the pivot 62, the shaft 26 passing through the slot. In order to hold the arm 61 in adjusted position there is provided upon that arm a spring catch 64 arranged to enter one of a series of holes 65 arranged in the arc of a circle adjacent the slot 63.

The machine herein described is efficient in action, and can be readily controlled from the driver's seat. It requires no attention other than guiding the same, and dumping the load when the hopper becomes filled, the other action being entirely automatic.

What is claimed, is:—

A loading machine, comprising a wheeled frame; a wheel driven inclined endless rake, a receptacle at the discharge end of the rake, said receptacle comprising side walls and downwardly converging front and rear walls, said rear wall being pivoted at its upper end and inclined downwardly and forwardly and in engagement with the front wall at its lower end when in closed position, catches for said rear wall for holding it against the front wall, and spring actuated means for moving it against the front wall for engagement by the catches.

In testimony whereof, I affix my signature, in presence of two witnesses.

JOSEPH COCKING.

Witnesses:
THEODORE KOFFEL,
D. K. GIBBS.